(12) United States Patent
Xie et al.

(10) Patent No.: US 9,919,239 B2
(45) Date of Patent: Mar. 20, 2018

(54) MULTIPLE DOWNCOMER TRAY AND TRAY COLUMN COMPRISING THE SAME

(71) Applicant: Beijing Zehua Chemical Engineering Co. Ltd., Beijing (CN)

(72) Inventors: Runxing Xie, Beijing (CN); Hongping Tang, Beijing (CN); Jiazhuo Lv, Beijing (CN)

(73) Assignee: Beijing Zehua Chemical Engineering Co., Ltd., Beijing (CN)

( * ) Notice: Subject to any disclaimer, the term of this patent is extended or adjusted under 35 U.S.C. 154(b) by 0 days.

(21) Appl. No.: 14/397,517

(22) PCT Filed: Aug. 27, 2013

(86) PCT No.: PCT/CN2013/082396
§ 371 (c)(1),
(2) Date: Oct. 28, 2014

(87) PCT Pub. No.: WO2015/018113
PCT Pub. Date: Feb. 12, 2015

(65) Prior Publication Data
US 2016/0144291 A1    May 26, 2016

(30) Foreign Application Priority Data
Aug. 5, 2013  (CN) .......................... 2013 1 0336601

(51) Int. Cl.
*B01D 3/32* (2006.01)
*B01D 3/20* (2006.01)

(52) U.S. Cl.
CPC ............. *B01D 3/324* (2013.01); *B01D 3/205* (2013.01)

(58) Field of Classification Search
CPC .......... B01D 3/326; B01D 3/324; B01D 3/205
See application file for complete search history.

(56) References Cited

U.S. PATENT DOCUMENTS 4,744,929 A * 5/1988 Robinson ............... B01J 19/305
                                                    202/158
5,098,615 A * 3/1992 Resetarits ................ B01D 3/20
                                                    202/158

(Continued)

FOREIGN PATENT DOCUMENTS

CN    1045357 A    9/1990
CN    1119960 A    4/1996

(Continued)

OTHER PUBLICATIONS

International Search Report corresponding to PCT/CN2013/082396, dated Aug. 27, 2013, (14 pages).

*Primary Examiner* — Amber R Orlando
*Assistant Examiner* — Stephen Hobson
(74) *Attorney, Agent, or Firm* — Maginot, Moore & Beck, LLP

(57) ABSTRACT

A multiple downcomer tray and a tray column comprising the same are provided. The multiple downcomer tray comprises: a tray body; at least one anti-jump plate disposed on the tray body to divide the tray body into at least two sections; and at least two downcomer assemblies disposed corresponding to the at least two sections respectively, in which each of the at least two downcomer assemblies comprises at least one tray floor, at least one downcomer and at least one liquid receiving pan which are disposed parallel to each other, and the liquid receiving pan and the downcomer are positioned at two sides of the tray floor respectively.

16 Claims, 12 Drawing Sheets

(56) References Cited

U.S. PATENT DOCUMENTS

| | | | | |
|---|---|---|---|---|
| 5,106,556 A * | 4/1992 | Binkley | B01D 3/22 | 261/114.1 |
| 5,382,390 A * | 1/1995 | Resetarits | B01D 3/20 | 261/114.3 |
| 5,454,989 A * | 10/1995 | Nutter | B01D 3/20 | 261/114.1 |
| 5,554,329 A * | 9/1996 | Monkelbaan | B01D 3/22 | 261/113 |
| 5,645,770 A * | 7/1997 | McNulty | B01D 3/008 | 261/97 |
| 5,975,504 A * | 11/1999 | Nutter | B01D 3/22 | 261/114.3 |
| 6,053,484 A * | 4/2000 | Fan | B01D 3/20 | 261/114.1 |
| 6,113,079 A * | 9/2000 | Urbanski | B01D 3/20 | 202/158 |
| 6,293,528 B1 * | 9/2001 | Monkelbaan | B01D 3/008 | 261/108 |
| 6,460,834 B2 * | 10/2002 | Konijn | B01D 3/20 | 261/114.1 |
| 6,817,596 B2 * | 11/2004 | Fischer | B01D 3/22 | 261/114.1 |
| 6,863,267 B2 * | 3/2005 | Bosmans | B01D 3/20 | 261/114.1 |
| 7,753,348 B2 * | 7/2010 | Lee | B01D 3/22 | 261/114.1 |
| 8,074,972 B2 * | 12/2011 | Agnello | B01D 3/324 | 261/114.1 |
| 8,430,380 B2 * | 4/2013 | Binkley | B01D 3/163 | 261/114.4 |
| 2001/0015504 A1 * | 8/2001 | Bosmans | B01D 3/20 | 261/114.1 |
| 2001/0047921 A1 * | 12/2001 | Bravo | B01D 3/20 | 196/14.52 |
| 2004/0036186 A1 * | 2/2004 | Lee | B01D 3/20 | 261/114.1 |
| 2004/0195707 A1 * | 10/2004 | Ender | B01D 3/008 | 261/97 |
| 2005/0045558 A1 * | 3/2005 | Northrup, Jr. | B01D 11/043 | 210/634 |
| 2009/0049864 A1 * | 2/2009 | Kovak | B01D 3/008 | 62/643 |
| 2009/0256270 A1 * | 10/2009 | Griepsma | B01D 3/163 | 261/114.5 |
| 2012/0111717 A1 * | 5/2012 | Headley | B01D 3/008 | 203/49 |
| 2012/0292791 A1 * | 11/2012 | Headley | B01D 3/225 | 261/114.1 |
| 2013/0234348 A1 * | 9/2013 | Nieuwoudt | B01D 3/225 | 261/114.5 |
| 2014/0284824 A1 * | 9/2014 | Bechtel | B01D 3/166 | 261/148 |
| 2016/0206970 A1 * | 7/2016 | Alzner | B01D 3/008 | |

FOREIGN PATENT DOCUMENTS

| | | | | |
|---|---|---|---|---|
| CN | 1126627 A | 7/1996 | | |
| CN | 2308428 Y | 2/1999 | | |
| CN | 1419946 A | 5/2003 | | |
| CN | 1613532 A | 5/2005 | | |
| FR | 2295770 A1 * | 7/1976 | | B01D 3/22 |
| GB | 606870 A * | 8/1948 | | B01D 3/20 |
| GB | 734254 A * | 7/1955 | | B01D 3/324 |
| GB | 1224876 A * | 3/1971 | | B01D 3/18 |
| KR | 20030008321 A * | 1/2003 | | |
| KR | 20020077469 A | 6/2004 | | |
| WO | WO-2004028657 A1 * | 4/2004 | | B01D 3/20 |
| WO | WO-2005063352 A1 * | 7/2005 | | B01D 3/20 |
| WO | WO2012158683 A2 | 11/2012 | | |

\* cited by examiner

MULTIPLE DOWNCOMER TRAY AND TRAY COLUMN COMPRISING THE SAME

CROSS-REFERENCE TO RELATED APPLICATION

This application is a national stage application of PCT/CN2013/082396, having an international filing date of Aug. 27, 2013, and which claims priority to and benefits of Chinese Patent Application Serial No. 201310336601.5, filed with the State Intellectual Property Office of P. R. China on Aug. 5, 2013, the entire content of which is incorporated herein by reference.

FIELD

The present invention relates to a chemical production equipment field, and more particularly relates to a multiple downcomer tray and a tray column comprising the same.

BACKGROUND

A tray column in the related art uses a tray floor as a basic member for gas-liquid contact, on which the gas phase and the liquid phase flow in an intersecting way. The gas phase and the liquid phase in the tray column flow reversely in series, and the liquid phase enters into the downcomer by overflow and then falls onto the liquid receiving pan of a lower tray. The tray can be classified into two types according to a flow direction of the liquid on the tray floor. The first type of tray is called an overflow tray, in which the flow directions of the liquids on the tray floors are parallel on the whole and the flow distances of the liquids on the tray floors are approximately the same. The second type of tray is called a multiple downcomer tray, such as the ADV-MP tray (U.S. Pat. No. 6,746,003 and Chinese Patent No. 1878601A), the Hi-Fi tray (U.S. Pat. No. 6,824,750 and Chinese Patent No. 1400918A), the MD tray (U.S. Pat. No. 3,410,540), the ECMD tray and so on. The flow of the liquid on the tray floor of the multiple downcomer tray is a diffusion flow, a contraction flow or a combined flow of both.

Compared with the overflow tray, the multiple downcomer tray has a greater liquid treatment capacity, and can overcome the problem of bias flow of the overflow tray. However, the flow of the liquid on the tray floor of the multiple downcomer tray is inhomogeneous and is the combined flow of the diffusion flow and the contraction flow (such as for the Hi-Fi tray, the MD tray and the ECMD tray) or the pure diffusion flow (such as for the ADV-MP tray). The flow directions of the liquids on the tray floors are not consistent and the flow distances of the liquids on the tray floors are not the same, and thus the liquid-gas ratios on the tray floors are not the same, which influences the tray efficiency of the multiple downcomer tray.

SUMMARY

The present invention seeks to solve at least one of the problems existing in the related art to at least some extent.

Accordingly, an objective of the present invention is to provide a multiple downcomer tray with excellent operation capability and high tray efficiency.

Another objective of the present invention is to provide a tray column comprising the multiple downcomer tray.

According to embodiments of a first aspect of the present invention, a multiple downcomer tray is provided. The multiple downcomer tray comprises: a tray body; at least one anti-jump plate disposed on the tray body to divide the tray body into at least two sections; and at least two downcomer assemblies disposed corresponding to the at least two sections respectively, in which each of the at least two downcomer assemblies comprises at least one tray floor, at least one downcomer and at least one liquid receiving pan which are disposed parallel to each other, and the liquid receiving pan and the downcomer are positioned at two sides of the tray floor respectively.

Thus, in the downcomer assembly corresponding to each section, the flow directions of the liquids are consistent, i.e., the flow directions of the liquids are parallel on the whole, and the flow distances of the liquids are approximately the same. Therefore, the liquid-gas ratios on the corresponding tray floors are substantially the same, and the distribution of the liquid phase and the gas phase is more uniform, such that the operation capability and tray efficiency of the multiple downcomer tray are enhanced.

Advantageously, the tray body is circular.

According to an embodiment of the present invention, the at least one anti-jump plate comprises a first anti-jump plate, and the first anti-jump plate divides the tray body into two sections. The at least two downcomer assemblies comprise a first downcomer assembly located in a first section at one side of the first anti-jump plate and parallel to the first anti-jump plate, and a second downcomer assembly located in a second section at the other side of the first anti jump plate and perpendicular to the first anti-jump plate.

According to a further embodiment of the present invention, the at least one anti jump plate further comprises a second anti-jump plate parallel to the first anti-jump plate, and the first anti-jump plate and the second anti jump plate divide the tray body into three sections. The at least two downcomer assemblies further comprise a third downcomer assembly located in a third section at a side of the second anti-jump plate away from the first anti-jump plate, spaced apart from the second downcomer assembly by the second anti-jump plate, and parallel to the second anti-jump plate.

Thus, with the multiple downcomer tray according to embodiments of the present invention, the tray body is divided into three sections by the two parallel anti-jump plates, the downcomers located in the second section between the anti-jump plates are perpendicular to the anti jump plates while the downcomers in the other two sections (i.e. the first and third sections) are parallel to the anti-jump plates, and the downcomers of an upper downcomer assembly are parallel to those of a lower downcomer assembly. Thus, the flow directions of the liquids on the tray floor are consistent and the flow distances of the liquids on the tray floors are approximately the same, the liquid-gas ratios on all the tray floors are substantially the same, and the distribution of the gas phase and the liquid phase is uniform, such that the operation capability and the tray efficiency of the tray are enhanced.

According to an embodiment of the present invention, the second downcomer assembly is symmetric with respect to a perpendicular bisector of the anti-jump plate. Thus, the distribution of the gas phase and the liquid phase on the second downcomer assembly is more uniform.

According to an embodiment of the present invention, a first bubbling unit is disposed on each tray floor of the at least two downcomer assemblies. Thus, by providing the first bubbling unit, the gas may pass through the liquid layer easily, such that the liquid layer can contact with the gas and then bubble to transfer mass or heat.

Alternatively, the first bubbling unit may be configured as a float valve, a fixed valve, a sieve hole, a bubble cap, a tongue hole, a guide hole, or a jet co-flow mass transfer unit. According to an embodiment of the present invention, a second bubbling unit is disposed on at least one of the liquid receiving pans of at least one of the at least two downcomer assemblies. Thus, by providing the second bubbling unit, the gas may pass through the liquid layer easily, such that the liquid layer can contact with the gas and then bubble to transfer mass or heat.

Alternatively, the second bubbling unit may be configured as a float valve, a fixed valve, a sieve hole, a bubble cap, a tongue hole, a guide hole, or a jet co-flow mass transfer unit.

According to an embodiment of the present invention, a bubbling promotion device is disposed between at least one of the tray floors of at least one of the at least two downcomer assemblies and a liquid receiving pan adjacent to the at least one of the tray floors, and a third bubbling unit is disposed on the bubbling promotion device. Thus, by providing the bubbling promotion device, the gas may pass through the liquid layer easily, such that the liquid layer can contact with the gas and then bubble to transfer mass or heat.

Alternatively, the third bubbling unit may be configured as a float valve, a fixed valve, a sieve hole, a bubble cap, a tongue hole, a guide hole, or a jet co-flow mass transfer unit.

According to an embodiment of the present invention, at least one of the downcomers of at least one of the at least two downcomer assemblies is cut off to form a hanging downcomer.

According to an embodiment of the present invention, an upper end of the liquid receiving pan of at least one of the at least two downcomer assemblies is flush with, higher than or lower than an upper surface of a tray floor adjacent to the liquid receiving pan.

According to an embodiment of the present invention, at least one first guide plate is disposed on at least one of the tray floors of at least one of the at least two downcomer assemblies.

Alternatively, an angle of the first guide plate with respect to the anti-jump plate may range from 0 to 180 degrees.

According to an embodiment of the present invention, at least one second guide plate is disposed on at least one of the liquid receiving pans of at least one of the at least two downcomer assemblies.

Alternatively, an angle of the second guide plate with respect to the anti-jump plate may range from 0 to 180 degrees.

According to an embodiment of the present invention, one end of the second guide plate is extended onto the tray floor adjacent to the liquid receiving pan on which the second guide plate is disposed.

According to an embodiment of the present invention, a first reinforcing structure is disposed on at least one of the downcomers of at least one of the at least two downcomer assemblies.

According to an embodiment of the present invention, an anti-splash plate is disposed in at least one of the downcomers of at least one of the at least two downcomer assemblies.

Alternatively, a lower end of the anti-splash plate is extended into the downcomer, and an upper end of the anti-splash plate is extended upwards out of the downcomer.

Advantageously, the anti-splash plate disposed in each downcomer comprises: a first anti-splash plate disposed vertically; and at least two second anti-splash plates disposed at two sides of the first anti-splash plate respectively and bent towards directions away from the first anti-splash plate respectively. Thus, it is easy to prevent the liquid from splashing and to guide the flow of the liquid.

According to an embodiment of the present invention, the downcomers of at least one of the at least two downcomer assemblies are communicated with each other.

According to another embodiment of the present invention, an end of the downcomer of the second downcomer assembly is communicated with the downcomer of the first downcomer assembly or the third downcomer assembly.

According to an embodiment of the present invention, a liquid seal pan is disposed below at least one of the downcomers of at least one of the at least two downcomer assemblies.

According to an embodiment of the present invention, a kinetic energy eliminating device is disposed on at least one of the liquid receiving pans of at least one of the at least two downcomer assemblies.

With the multiple downcomer tray according to embodiments of the present invention, by combining with the advantages of the overflow tray and changing the structure of the multiple downcomer tray in the related art, the flow state of the liquid phase is improved, and the operation capability and tray efficiency of the tray are enhanced.

According to embodiments of a second aspect of the present invention, a tray column is provided. The tray column comprises: a column body; and a plurality of multiple downcomer trays according to embodiments of the first aspect of the present invention disposed in the column body and spaced apart from each other in a vertical direction.

According to an embodiment of the present invention, the at least one anti-jump plate comprises a first anti-jump plate dividing the tray body into two sections. The at least two downcomer assemblies comprise a first downcomer assembly located in a first section at one side of the first anti-jump plate and parallel to the first anti-jump plate, and a second downcomer assembly located in a second section at the other side of the first anti-jump plate and perpendicular to the first anti-jump plate. The liquid receiving pan and the downcomer of the first downcomer assembly of a lower multiple downcomer tray are located below the downcomer and the liquid receiving pan of the first downcomer assembly of an upper multiple downcomer tray respectively, and the liquid receiving pan and the downcomer of the second downcomer assembly of the lower multiple downcomer tray are located below the downcomer and the liquid receiving pan of the second downcomer assembly of the upper multiple downcomer tray respectively, in which the lower multiple downcomer tray is consecutively below the upper multiple downcomer tray.

Further, a second reinforcing structure is disposed between the liquid receiving pan of the first downcomer assembly of the lower multiple downcomer tray and the downcomer of the first downcomer assembly of the upper multiple downcomer tray, or between the liquid receiving pan of the second downcomer assembly of the lower multiple downcomer tray and the downcomer of the second downcomer assembly of the upper multiple downcomer tray.

According to further embodiments of the present invention, the at least one anti-jump plate further comprises a second anti-jump plate parallel to the first anti-jump plate, and the first anti-jump plate and the second anti jump plate divide the tray body into three sections; the at least two downcomer assemblies further comprise a third downcomer assembly located in a third section at a side of the second anti-jump plate away from the first anti-jump plate, spaced apart from the second downcomer assembly by the second anti-jump plate, and parallel to the second anti-jump plate, in which the liquid receiving pan and the downcomer of the third downcomer assembly of the lower multiple downcomer tray are located below the downcomer and the liquid receiving pan of the third downcomer assembly of the upper multiple downcomer tray respectively.

Further, a second reinforcing structure is disposed between the liquid receiving pan of the third downcomer assembly of the lower multiple downcomer tray and the downcomer of the third downcomer assembly of the upper multiple downcomer tray.

Additional aspects and advantages of the embodiments of the present invention will be given in part in the following descriptions, become apparent in part from the following descriptions, or be learned from the practice of the embodiments of the present invention.

BRIEF DESCRIPTION OF THE DRAWINGS

These and other aspects and advantages of the invention will become apparent and more readily appreciated from the following descriptions taken in conjunction with the drawings in which:

FIG. 13b is a sectional view of the multiple downcomer tray along an A-A line in FIG. 13a;

FIG. 14b is a sectional view of the multiple downcomer tray along an A-A line in FIG. 14a;

FIG. 15b is a sectional view of the multiple downcomer tray along an A-A line in FIG. 15a;

FIG. 16b is a sectional view of the multiple downcomer tray along an A-A line in FIG. 16a;

FIG. 18b is a sectional view of the multiple downcomer tray along an A-A line in FIG. 18a;

Figure 1:
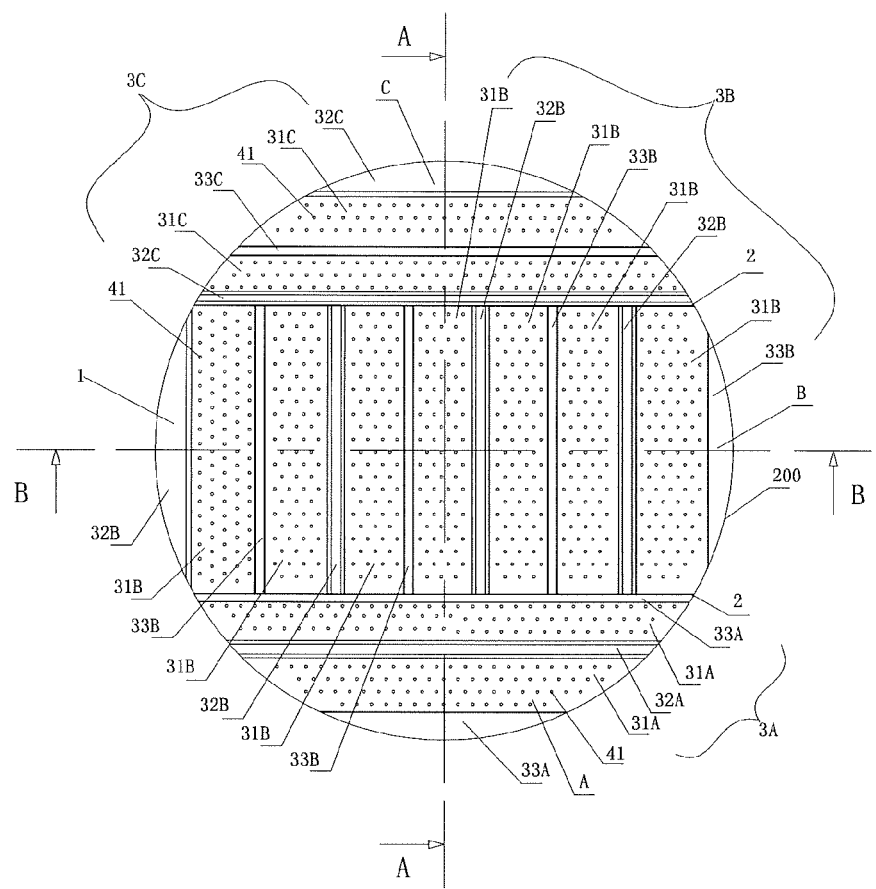
FIG. 1 is a schematic view of a multiple downcomer tray according to an embodiment of the present invention.

REFERENCE NUMERALS 100 multiple downcomer tray
A first section
B second section
C third section
1 tray body
2 anti-jump plate
21 first anti-jump plate
22 second anti-jump plate
3A first downcomer assembly
31A first tray floor
32A first downcomer
33A first liquid receiving pan
3B second downcomer assembly
31B second tray floor
32B second downcomer
33B second liquid receiving pan
3C third downcomer assembly
31C third tray floor
32C third downcomer
33C third liquid receiving pan
321 hanging downcomer
34 communicating pipe
41 first bubbling unit
42 second bubbling unit
43 bubbling promotion device
431 third bubbling unit
51 first guide plate
52 second guide plate 61 first reinforcing structure
62 second reinforcing structure
7 anti-splash plate
71 first anti-splash plate
9 second anti-splash plate
8 liquid seal pan
9 kinetic energy eliminating device
200 column body

DETAILED DESCRIPTION

Embodiments of the present invention will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present invention. The embodiments shall not be construed to limit the present invention. It is to be understood that phraseology and terminology used herein with reference to device or element orientation (such as, terms like "longitudinal", "lateral", "up", "down", "front", "rear", "left", "right", "vertical", "horizontal", "top", "bottom", "inside", "outside") are only used to simplify description of the present invention, and do not indicate or imply that the device or element referred to must have or operated in a particular orientation. They cannot be seen as limits to the present invention. Moreover, terms of "first" and "second" are only used for description and cannot be seen as indicating or implying relative importance.

Unless otherwise stipulated and restricted, it is to be explained that terms of "installation", "linkage" and "connection" shall be understood broadly, for example, it could be permanent connection, removable connection or integral connection; it could be direct linkage, indirect linkage or inside linkage within two elements. Those of ordinary skill in the art shall understand the concrete notations of the terms mentioned above according to specific circumstances.

In the description of the present invention, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

In the following, the tray column and the multiple downcomer tray according to embodiments of the present invention will be described with reference to FIGS. 1-22. The tray column comprises a plurality of multiple downcomer trays 100 and a column body 200, and the plurality of multiple downcomer trays 100 are disposed in the column body 200 in a vertical direction.

According to embodiments of the present invention, the multiple downcomer tray 100 comprises a tray body 1, at least one anti jump plate 2 and at least two downcomer assemblies. The tray body 1 is disposed in the column body 200. The at least one anti jump plate 2 is disposed on the tray body 1 to divide the tray body 1 into at least two sections. The at least two downcomer assemblies are disposed corresponding to the at least two sections respectively, each of the at least two downcomer assemblies comprises at least one tray floor, at least one downcomer and at least one liquid receiving pan which are disposed parallel to each other, and the liquid receiving pan and the downcomer are positioned at two sides of the tray floor respectively.

Thus, in the downcomer assembly corresponding to each section, the flow directions of the liquids are consistent, i.e., the flow directions of the liquids are parallel on the whole, and the flow distances of the liquids are approximately the same. Therefore, the gas-liquid ratios on the corresponding tray floors are substantially the same, and the distribution of the gas phase and the liquid phase is uniform, such that the operation capability and tray efficiency of the multiple downcomer tray 100 are enhanced.

It can be understood that, in the description of the present invention, the expression "the at least one of the tray floors of at least one of the at least two downcomer assemblies" means one of, a plurality of or all of the tray floors of the corresponding downcomer assembly. Similarly, the expression "the tray floors of one of the at least two downcomer assemblies" means one of, a plurality of or all of the tray floors of the corresponding downcomer assembly, the expression "the downcomers of one of the at least two downcomer assemblies" means one of, a plurality of, or all of the downcomers of the corresponding downcomer assembly, and the expression "the liquid receiving pans of one of the at least two downcomer assemblies" means one of, a plurality of, or all of the liquid receiving pans of the corresponding downcomer assembly.

Advantageously, the tray body 1 is circular, i.e., the cross section of the tray column is circular. Certainly, the tray body 1 may be of other shapes, such as ellipse, polygon and so on. In the following description and the drawings, a circular tray body 1 is taken as an example for explanation.

Figure 20:
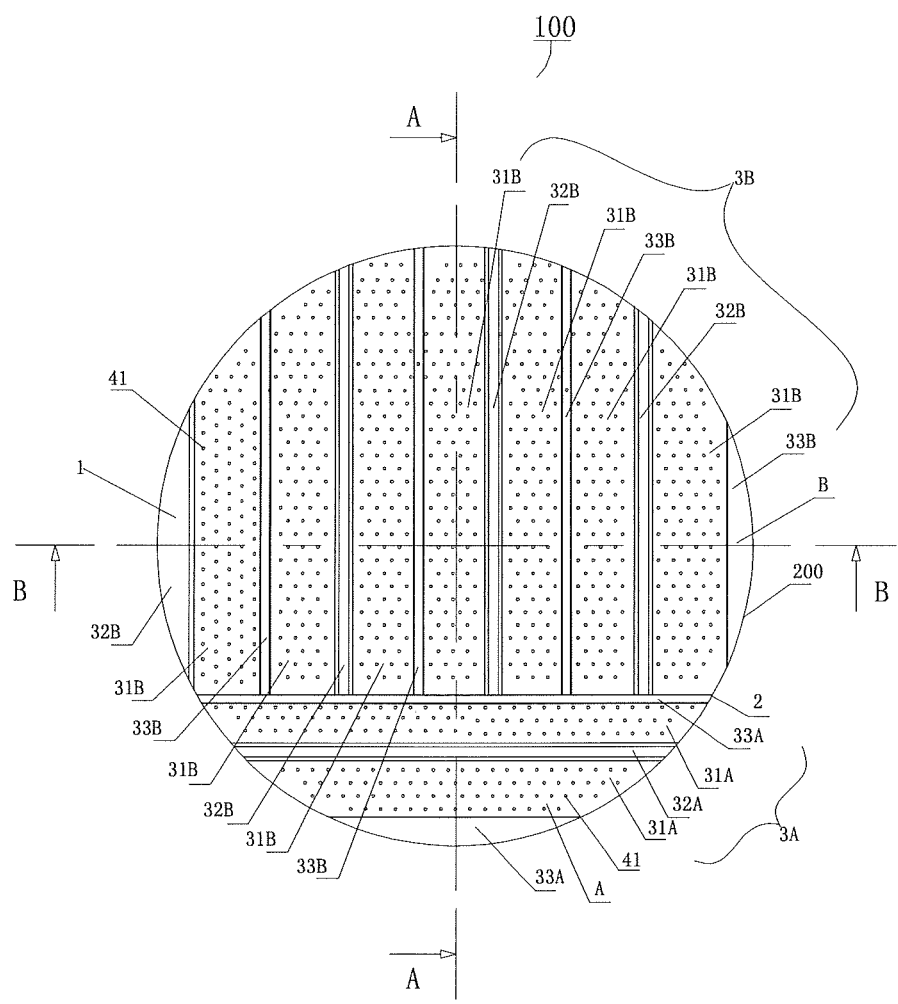
FIG. 20 is a sectional view of a tray column showing a multiple downcomer tray according to an embodiment of the present invention.
Figure 21:
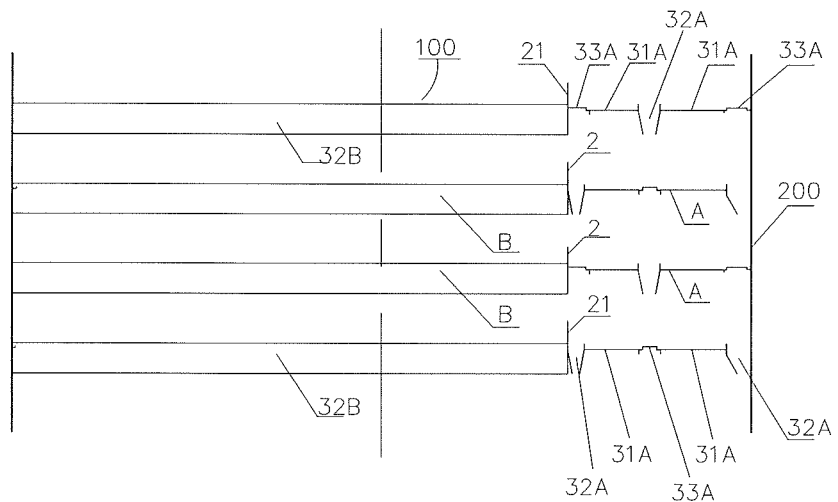
FIG. 21 is a sectional view of the tray column along an A-A line in FIG. 20.
Figure 22:
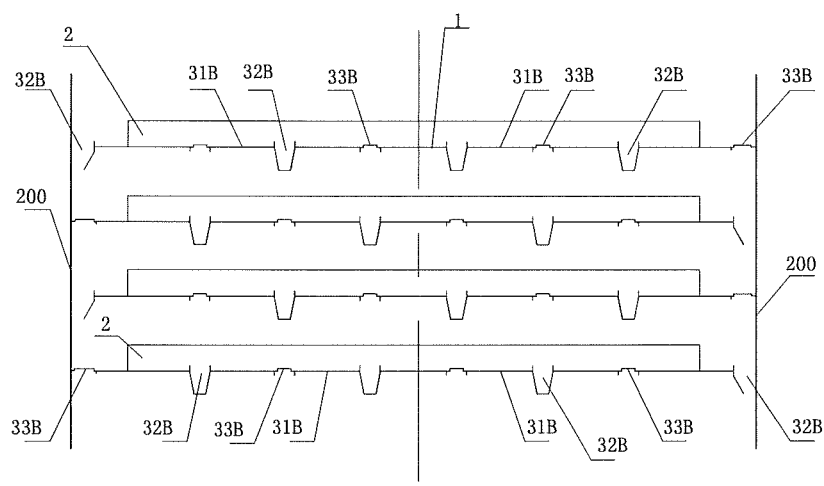
FIG. 22 is a sectional view of the tray column along a B-B line in FIG. 20.

As shown in FIGS. 20-22, in some embodiments of the present invention, the at least one anti-jump plate 2 comprises a first anti-jump plate 21, and the first anti-jump plate 21 divides the tray body 1 into two sections. The at least two downcomer assemblies comprise a first downcomer assembly 3A and a second downcomer assembly 3B, the first downcomer assembly 3A is located in a first section A at one side (such as the lower side in FIG. 20) of the first anti-jump plate 21 and is parallel to the first anti-jump plate 21, and the second downcomer assembly 3B is located in a second section B at the other side of the first anti jump plate 21 and is vertical to the first anti-jump plate 21.

Figure 2:
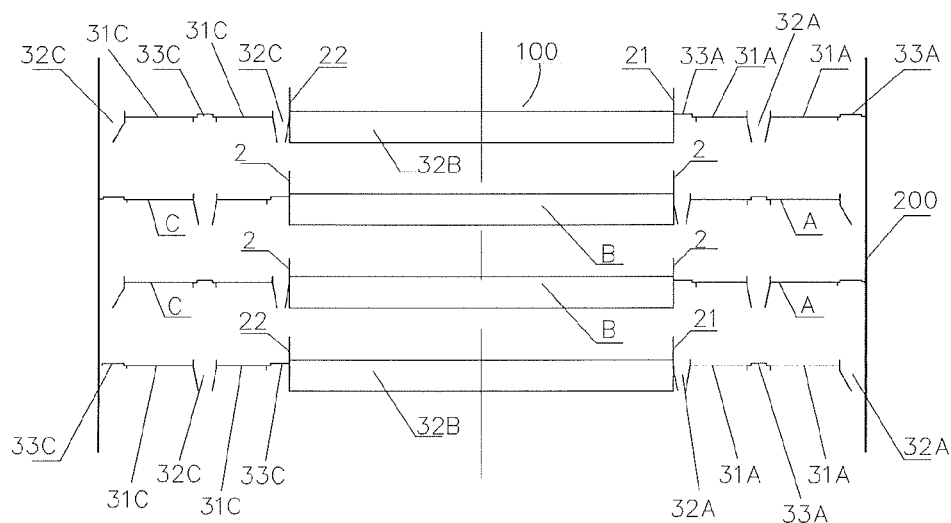
FIG. 2 is a sectional view of the multiple downcomer tray along an A-A line in FIG. 1.
Figure 3:
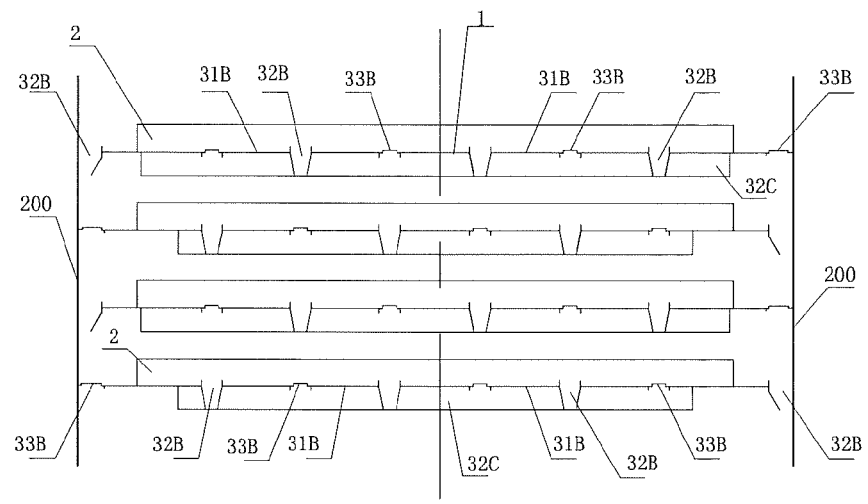
FIG. 3 is a sectional view of the multiple downcomer tray along a B-B line in FIG. 1.

As shown in FIGS. 1-3, according to further embodiments of the present invention, there are two anti-jump plates 2, i.e., the at least two anti-jump plates 2 comprise the first anti-jump plate 21 and a second anti-jump plate 22, the first anti-jump plate 21 and the second anti-jump plate 22 are disposed on the tray body 1 parallel to each other, and the first anti jump plate 21 and the second anti-jump plate 22 divide the tray body 1 into three sections. The at least two downcomer assemblies comprise the first downcomer assembly 3A, the second downcomer assembly 3B and a third downcomer assembly 3C, the second downcomer assembly 3B is located in the second section B between the two anti-jump plates 2 and is vertical to the anti jump plates 2, and the first downcomer assembly 3A and the third downcomer assembly 3C are located in the first section A and the third section C on two sides of the anti-jump plates 2 respectively and are parallel to the anti-jump plates 2. In other words, the first downcomer assembly 3A is located in the first section A at a side of the first anti-jump plate 21 away from the second anti-jump plate 22, is spaced apart from the second downcomer assembly 3B by the first anti-jump plate 21, and is parallel to the first anti-jump plate 21. Similarly, the third downcomer assembly 3C is located in the third section C at a side of the second anti-jump plate 22 away from the first anti-jump plate 21, is spaced apart from the second downcomer assembly 3B by the second anti-jump plate 22, and is parallel to the second anti-jump plate 22.

Specifically, the tray body 1 is provided with two anti-jump plates 2 parallel to each other, and two ends of the anti-jump plates 2 are connected with the circumferential wall of the column body 200, i.e., the anti-jump plates 2 are extended through the tray body 1. The two anti jump plates 2 divide the multiple downcomer tray into three sections, the first section A is formed between the first anti-jump plate 21 and the circumferential wall of the column body 200, the third section C is formed between the second anti-jump plate 22 and the circumferential wall of the column body 200, and the second section B is formed between the first anti-jump plate 21 and the second anti-jump plate 22.

At least one first tray floor 31A, at least one first downcomer 32A and at least one first liquid receiving pan 33A are disposed in the first section A, the first downcomer 32A and the first liquid receiving pan 33A are located on two sides of each first tray floor 31A, and the first tray floor 31A, the first liquid receiving pan 32A and the first liquid receiving pan 33A are parallel to the anti-jump plate 2. At least one second tray floor 31B, at least one second downcomer 32B and at least one first liquid receiving pan 33B are disposed in the second section B, the second downcomer 32B and the second liquid receiving pan 33B are located on two sides of each second tray floor 31B, and the second tray floor 31B, the second liquid receiving pan 32B and the second liquid receiving pan 33B are vertical to the anti-jump plate 2. At least one third tray floor 31C, at least one third downcomer 32C and at least one third liquid receiving pan 33C are disposed in the third section C, the third downcomer 32C and the third liquid receiving pan 33C are located on two sides of each third tray floor 31C, and the third tray floor 31C, the third liquid receiving pan 32C and the third liquid receiving pan 33C are parallel to the anti-jump plate 2.

With reference to FIG. 2 and FIG. 3, the liquid receiving pan and the downcomer of the first downcomer assembly 3A of a lower multiple downcomer tray are located below the downcomer and the liquid receiving pan of the first downcomer assembly 3A of an upper multiple downcomer tray respectively, the liquid receiving pan and the downcomer of the third downcomer assembly 3C of the lower multiple downcomer tray are located below the downcomer and the liquid receiving pan of the third downcomer assembly 3C of the upper multiple downcomer tray respectively, and the liquid receiving pan and the downcomer of the second downcomer assembly 3B of the lower multiple downcomer tray are located below the downcomer and the liquid receiving pan of the second downcomer assembly 3B of the upper multiple downcomer tray respectively, in which the lower multiple downcomer tray is consecutively below the upper multiple downcomer tray.

Specifically, as shown in FIG. 2 and FIG. 3, the lower multiple downcomer tray is consecutively below the upper multiple downcomer tray. As shown in FIG. 2, the first liquid receiving pan 33A of the lower multiple downcomer tray is located below the first downcomer 32A of the upper multiple downcomer tray, and the first downcomer 32A of the lower multiple downcomer tray is located below the first liquid receiving pan 33A of the upper multiple downcomer tray. As shown in FIG. 2, the third liquid receiving pan 33C of the lower multiple downcomer tray is located below the third downcomer 32C of the upper multiple downcomer tray, and the third downcomer 32C of the lower multiple downcomer tray is located below the third liquid receiving pan 33C of the upper multiple downcomer tray. As shown in FIG. 3, the second liquid receiving pan 33B of the lower multiple downcomer tray is located below the second downcomer 32B of the upper multiple downcomer tray, and the second downcomer 32B of the lower multiple downcomer tray is located below the second liquid receiving pan 33B of the upper multiple downcomer tray.

With the multiple downcomer tray according to embodiments of the present invention, the tray body is divided into three sections by the two parallel anti-jump plates, the downcomers in the second section between the two anti jump plates are vertical to the anti-jump plates while the downcomers in the other two sections (i.e. the first and third sections) are parallel to the anti jump plates, and the downcomers of an upper multiple downcomer tray are parallel to those of a lower multiple downcomer tray. Thus, the flow directions of the liquids on the tray floors are consistent and the flow distances of the liquids on the tray floors are approximately the same, the liquid-gas ratios on all the tray floors are substantially the same, and the distribution of the gas phase and the liquid phase is more uniform, such that the operation capability and the tray efficiency of the tray are enhanced.

For the sake of clarity, two anti-jump plates 2 and three downcomer assemblies are taken as an example to explain the present invention in the following description. Those skilled in the art should understand that there may be one or more than three anti-jump plates, and there may be two or more than four corresponding downcomer assemblies, and the structure and principle thereof are the same, which will not be described in detail herein.

Figure 4:
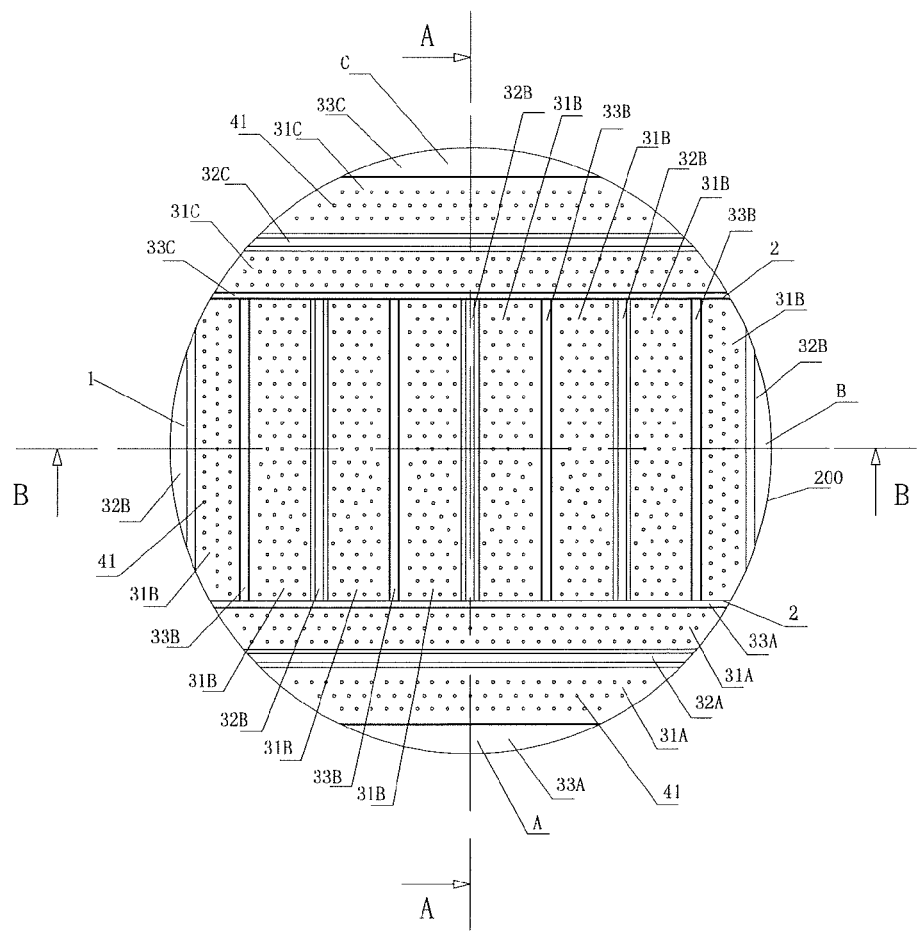
FIG. 4 is a schematic view of a multiple downcomer tray according to another embodiment of the present invention.
Figure 5:
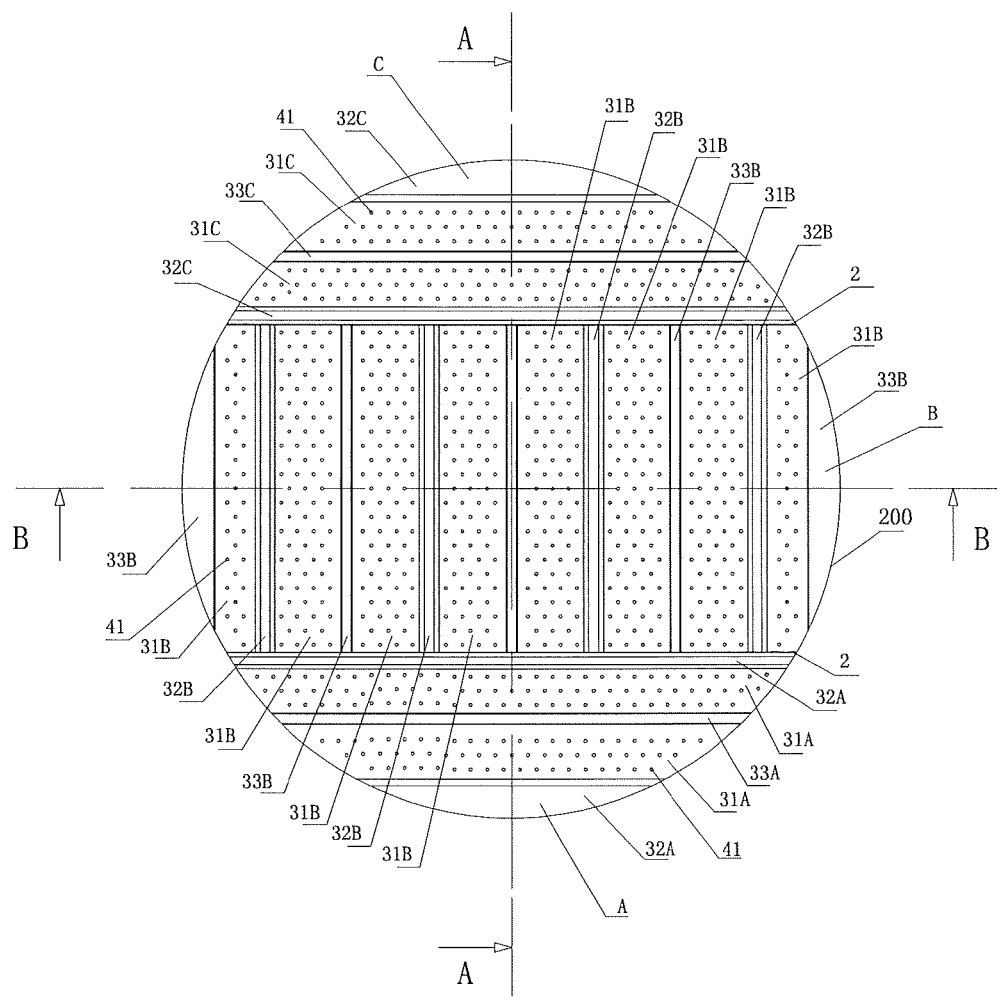
FIG. 5 is a schematic view of a multiple downcomer tray adjacent to the multiple downcomer tray shown in FIG. 4.
Figure 6:
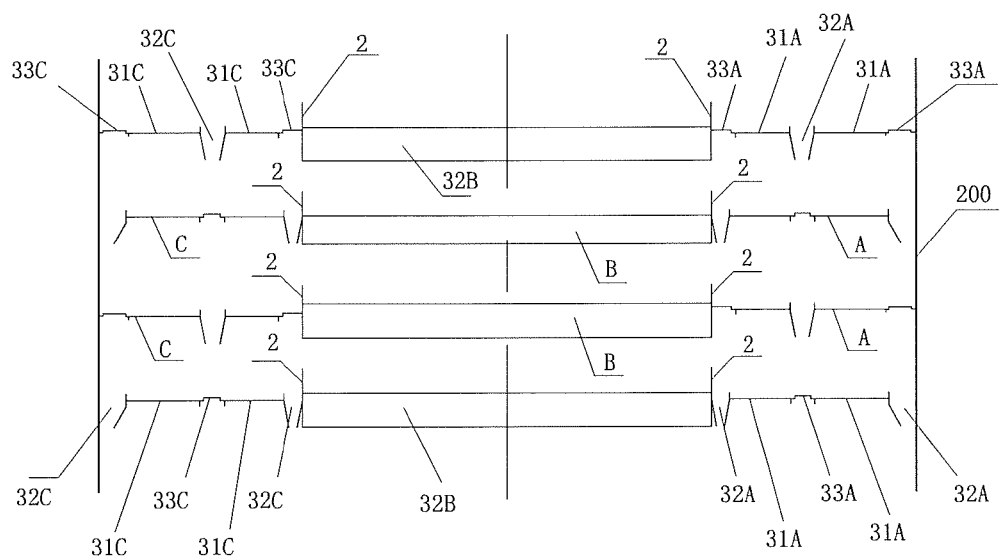
FIG. 6 is a sectional view of the multiple downcomer trays along A-A lines in FIG. 4 and FIG. 5.
Figure 7:
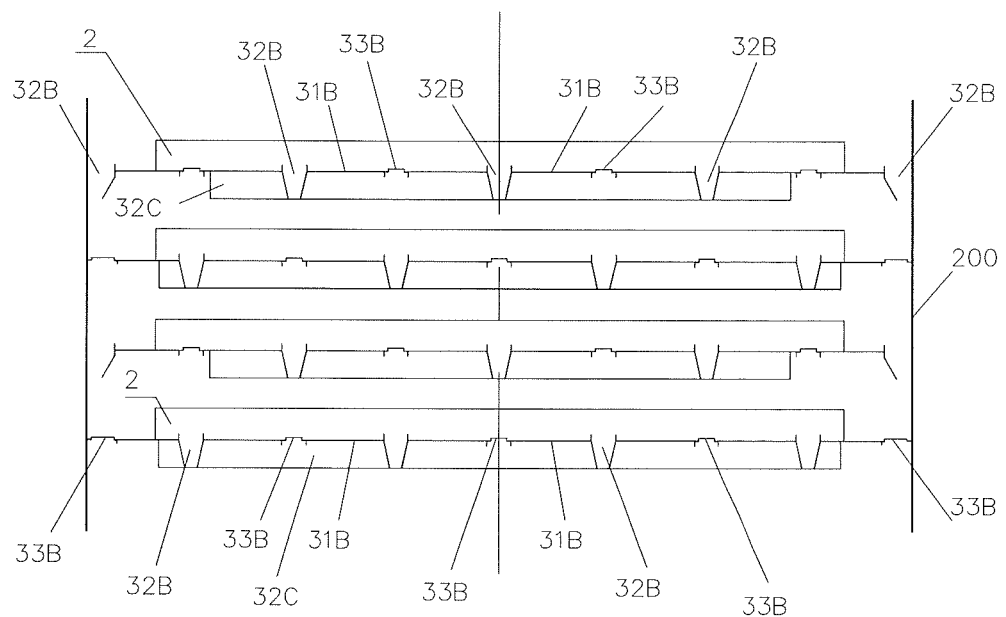
FIG. 7 is a sectional view of the multiple downcomer trays along B-B lines in FIG. 4 and FIG. 5.

In one embodiment, the second downcomer assembly 3B is symmetric with respect to a perpendicular bisector of the anti-jump plate 2. As used herein, the term "perpendicular bisector" means the line that is located in the center of the anti jump plate 2 and is perpendicular to the anti-jump plate 2. For example, the hatching lines A-A shown in FIG. 1 and FIG. 20 overlap with the perpendicular bisector. Thus, the distribution of the gas phase and the liquid phase on the second downcomer assembly 3B is more uniform. For example, when the second downcomer assembly 3B has an even number of second tray floors 31B, the multiple downcomer tray is formed as a symmetrical structure with respect to the line A-A, as shown in FIG. 4. When the structure of the multiple downcomer tray is shown in FIG. 4, the structure of the multiple downcomer tray adjacent to the multiple downcomer tray in FIG. 4 is shown in FIG. 5, and the sectional views of the two multiple downcomer trays along the A-A lines and the B-B lines are shown in FIG. 6 and FIG. 7 respectively.

According to an embodiment of the present invention, a first bubbling unit 41 is disposed on the tray floors of the first downcomer assembly 3A, the second downcomer assembly 3B and the third downcomer assembly 3C. In other words, the first bubbling unit 41 is disposed on each of the first tray floor 31A, the second tray floor 31B and the third tray floor 31C, as shown in FIG. 1. The first bubbling unit 41 may be configured as a float valve, a fixed valve, a sieve hole, a bubble cap, a tongue hole, a guide hole, or a jet co-flow mass transfer unit.

Thus, by providing the first bubbling unit 41, the gas may pass through the liquid layer easily, such that the liquid layer can contact with the gas and then bubble to transfer mass or heat.

Figure 8:
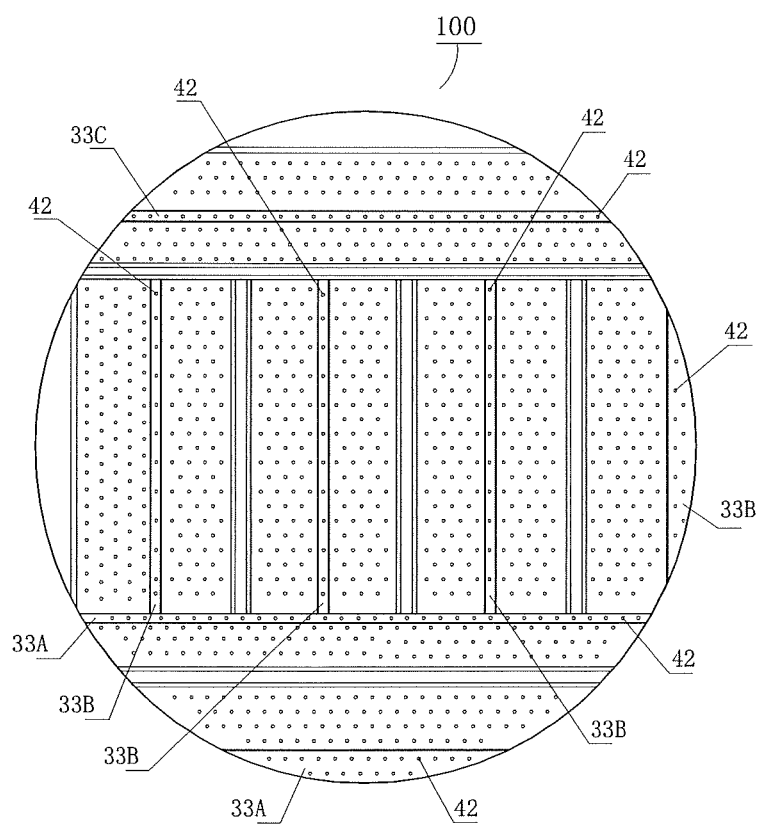
FIG. 8 is a schematic view of a multiple downcomer tray showing a second bubbling unit according to an embodiment of the present invention.

Further, a second bubbling unit 42 is disposed on at least one of the liquid receiving pans of at least one of the first downcomer assembly 3A, the second downcomer assembly 3B and the third downcomer assembly 3C. In other words, the second bubbling unit 42 is disposed on at least one of the first liquid receiving pan 33A, the second liquid receiving pan 33B and the third liquid receiving pan 33C, as shown in FIG. 8. Alternatively, the second bubbling unit 42 may be configured as a float valve, a fixed valve, a sieve hole, a bubble cap, a tongue hole, a guide hole, or a jet co-flow mass transfer unit. Thus, by providing the second bubbling unit 42, the gas may pass through the liquid layer easily, such that the liquid layer can contact with the gas and then bubble to transfer mass or heat.

Figure 16A:
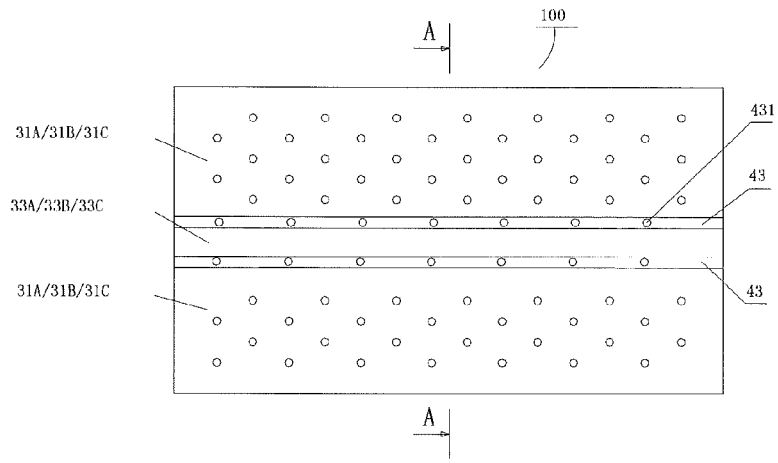
FIG. 16a is a schematic partial view of a multiple downcomer tray showing a bubbling promotion device according to an embodiment of the present invention.
Figure 16B:
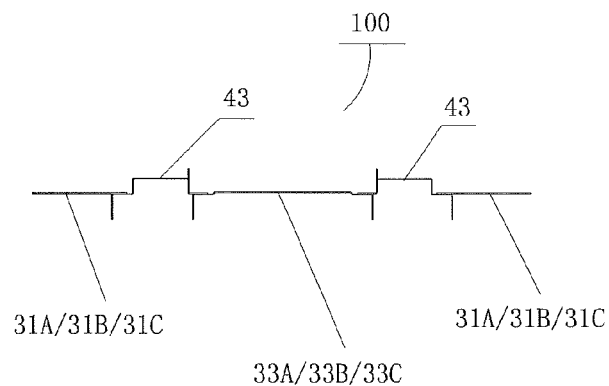

Further, a bubbling promotion device 43 is disposed between at least one of the tray floors of at least one of the first downcomer assembly 3A, the second downcomer assembly 3B and the third downcomer assembly 3C and a liquid receiving pan adjacent to the at least one of the tray floors, and a third bubbling unit 431 is disposed on the bubbling promotion device 43. In other words, the bubbling promotion device 43 is disposed between the first tray floor 31A and the first liquid receiving pan 33A, or between the second tray floor 31B and the second liquid receiving pan 33B, or between the third tray floor 31C and the third liquid receiving pan 33C, and the third bubbling unit 431 is disposed on the bubbling promotion device 43, as shown in FIG. 16a and FIG. 16b. The third bubbling unit 431 may be configured as a float valve, a fixed valve, a sieve hole, a bubble cap, a tongue hole, a guide hole, or a jet co-flow mass transfer unit.

Figure 9:
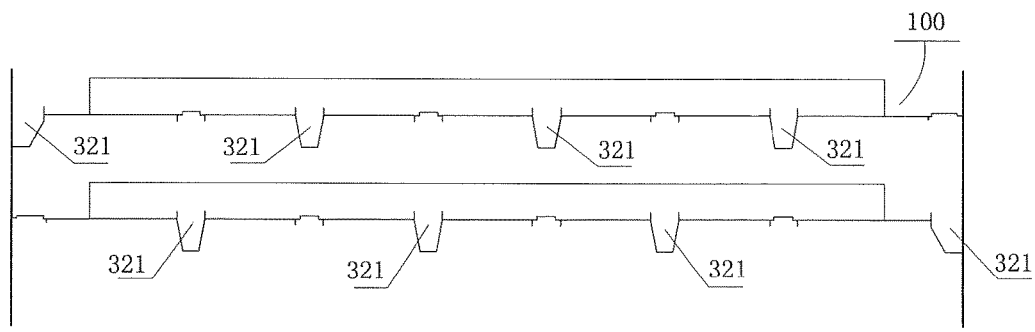
FIG. 9 is a sectional view of a multiple downcomer tray showing a hanging downcomer according to an embodiment of the present invention.

In some embodiments of the present invention, at least one of the downcomers of at least one of the first downcomer assembly 3A, the second downcomer assembly 3B and the third downcomer assembly 3C is cut off to form a hanging downcomer 321. In other words, the first downcomer 32A, the second downcomer 32B, or the third downcomer 32C is cut off to form the hanging downcomer 321, as shown in FIG. 9.

Figure 10A:
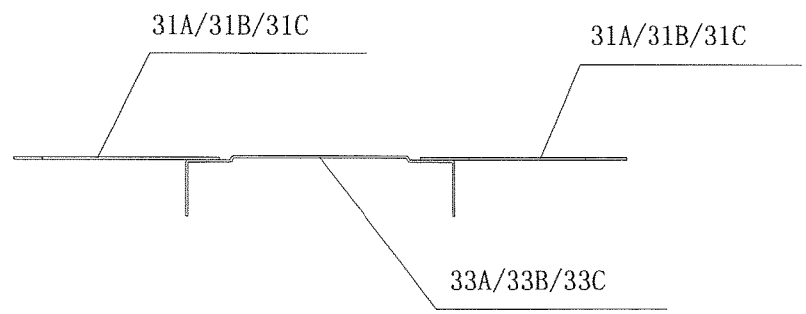
FIGS. 10a-c are schematic partial views of multiple downcomer trays according to embodiments of the present invention, in which an upper end of a liquid receiving pan in FIG. 10a is flush with an upper surface of a tray floor adjacent to the liquid receiving pan, an upper end of a liquid receiving pan in FIG. 10b is lower than an upper surface of a tray floor adjacent to the liquid receiving pan, and an upper end of a liquid receiving pan in FIG. 10c is higher than an upper surface of a tray floor adjacent to the liquid receiving pan.
Figure 10B:
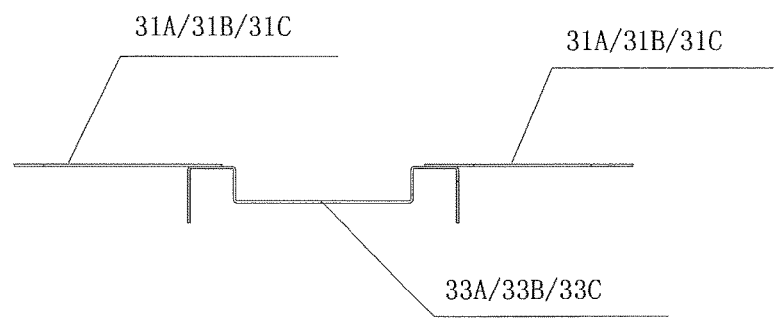
Figure 10C:
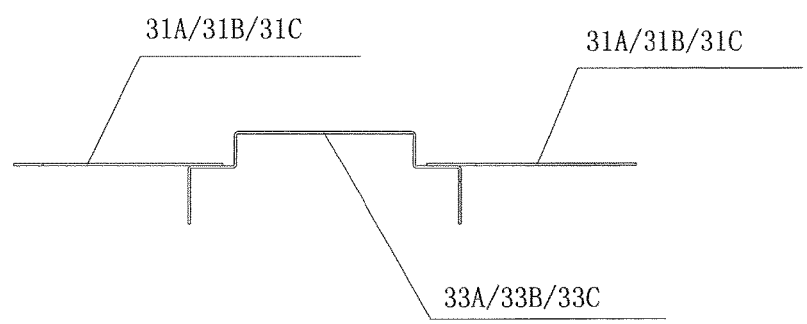

According to some embodiments of the present invention, an upper end of the liquid receiving pan of at least one of the first downcomer assembly 3A, the second downcomer assembly 3B and the third downcomer assembly 3C is flush with, higher than or lower than an upper surface of a tray floor adjacent to the liquid receiving pan. As shown in FIG. 10a, the upper end of the liquid receiving pan 33A/33B/33C is flush with the upper surface of the tray floor 31A/31B/31C adjacent to the liquid receiving pan 33A/33B/33C; as shown in FIG. 10b, the upper end of the liquid receiving pan 33A/33B/33C is lower than the upper surface of the tray floor 31A/31B/31C adjacent to the liquid receiving pan 33A/33B/33C; and as shown in FIG. 10c, the upper end of the liquid receiving pan 33A/33B/33C is higher than the upper surface of the tray floor 31A/31B/31C adjacent to the liquid receiving pan 33A/33B/33C. In other words, the upper end of the liquid receiving pan 33A is flush with, higher than or lower than the upper surface of the tray floor 31A adjacent to the liquid receiving pan 33A; the upper end of the liquid receiving pan 33B is flush with, higher than or lower than the upper surface of the tray floor 31B adjacent to the liquid receiving pan 33B; and the upper end of the liquid receiving pan 33C is flush with, higher than or lower than the upper surface of the adjacent tray floor 31C adjacent to the liquid receiving pan 33C.

Figure 11:
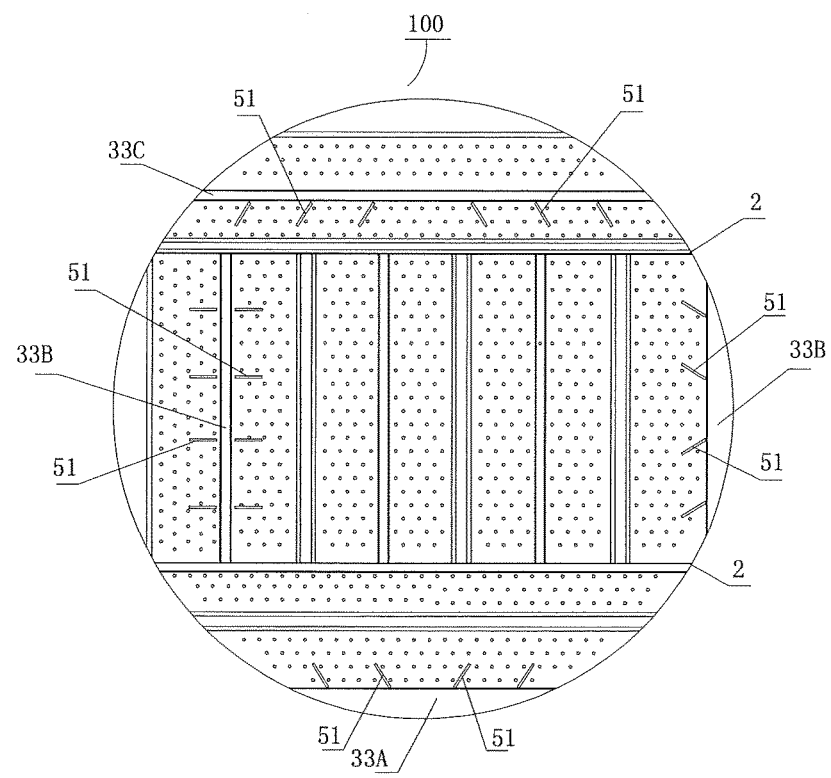
FIG. 11 is a schematic view of a multiple downcomer tray showing a first guide plate according to an embodiment of the present invention.

In some embodiments of the present invention, at least one first guide plate 51 is disposed on at least one of the tray floors of at least one of the first downcomer assembly 3A, the second downcomer assembly 3B and the third downcomer assembly 3C. In other words, at least one first guide plate 51 is disposed on at least one of the first tray floor 31A, the second tray floor 31B and the third tray floor 31C, as shown in FIG. 11. Alternatively, an angle of the first guide plate 51 with respect to the anti jump plate 2 ranges from 0 to 180 degrees.

Figure 12:
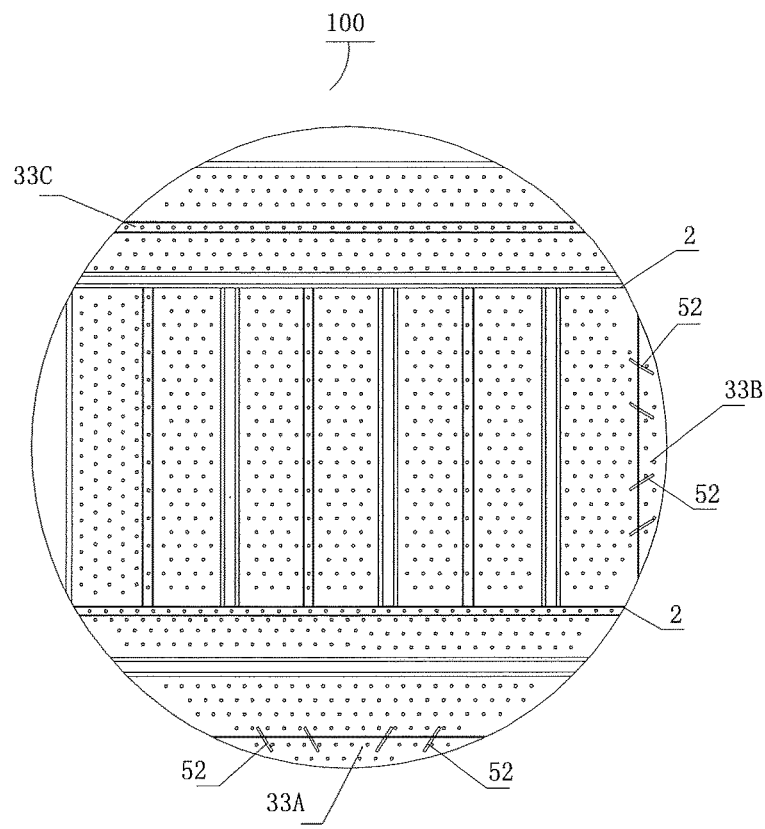
FIG. 12 is a schematic view of a multiple downcomer tray showing a second guide plate according to an embodiment of the present invention.

Further, at least one second guide plate 52 is disposed on at least one of the liquid receiving pans of at least one of the first downcomer assembly 3A, the second downcomer assembly 3B and the third downcomer assembly 3C. In other words, at least one second guide plate 52 is disposed on at least one of the first liquid receiving pan 33A, the second liquid receiving pan 33B and the third liquid receiving pan 33C, as shown in FIG. 12. Alternatively, an angle of the second guide plate 52 with respect to the anti-jump plate 2 ranges from 0 to 180 degrees.

Advantageously, an end of the second guide plate 52 is extended onto the tray floor adjacent to the liquid receiving pan on which the second guide plate 52 is disposed. Specifically, as shown in FIG. 12, the second guide plate 52 on the first liquid receiving pan 33A is extended onto the first tray floor 31A, the second guide plate 52 on the second liquid receiving pan 33B is extended onto the second tray floor 31B, or the second guide plate 52 on the third liquid receiving pan 33C is extended onto the third tray floor 31C.

Figure 13A:
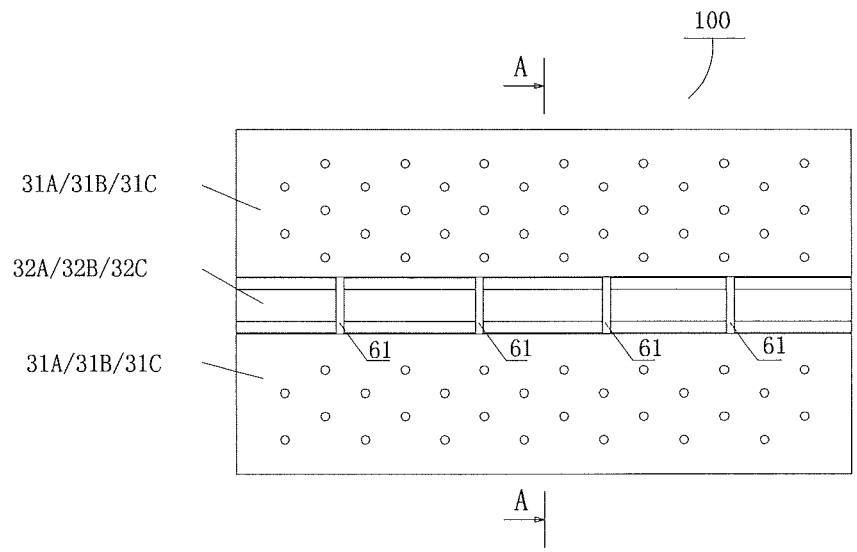
FIG. 13a is a schematic partial view of a multiple downcomer tray showing a first reinforcing structure according to an embodiment of the present invention.
Figure 13B:
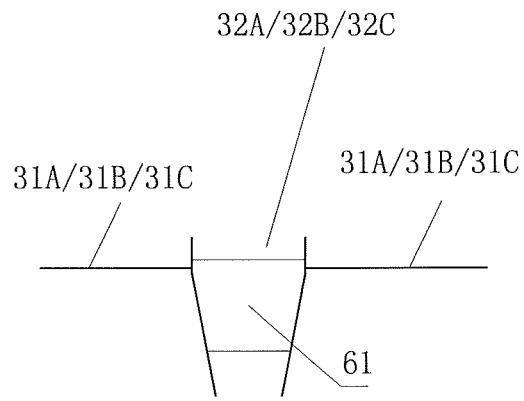

According to some embodiments of the present invention, a first reinforcing structure 61 is disposed on at least one of the downcomers of at least one of the first downcomer assembly 3A, the second downcomer assembly 3B and the third downcomer assembly 3C. In other words, a first reinforcing structure 61 is disposed on at least one of the first downcomer 32A, the second downcomer 32B and the third downcomer 32C, as shown in FIG. 13a and FIG. 13b.

Figure 14A:
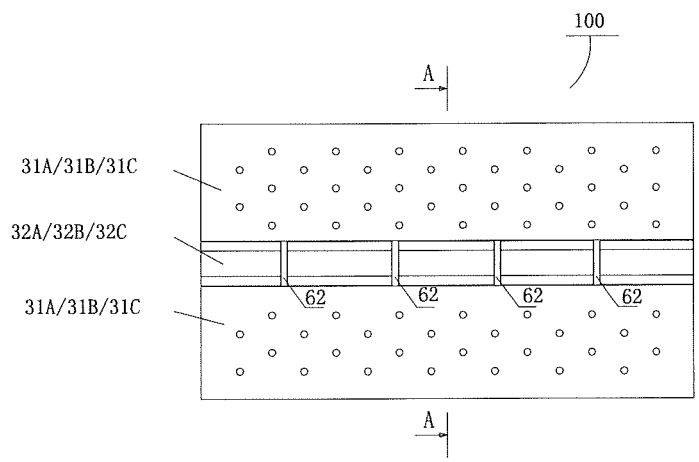
FIG. 14a is a schematic partial view of a multiple downcomer tray showing a second reinforcing structure according to an embodiment of the present invention.
Figure 14B:
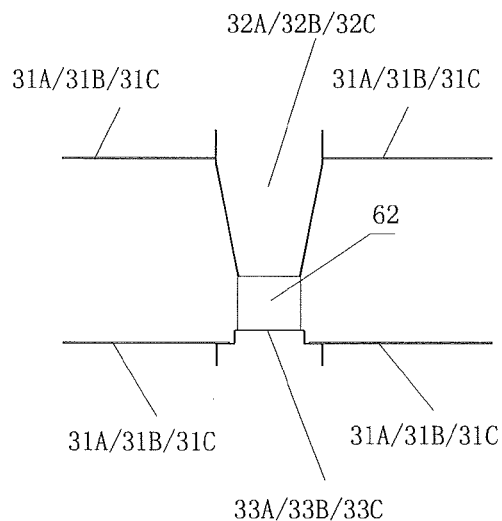

Further, a second reinforcing structure 62 is disposed between the liquid receiving pan of the first downcomer assembly 3A of the lower multiple downcomer tray and the downcomer of the first downcomer assembly 3A of the upper multiple downcomer tray, between the liquid receiving pan of the third downcomer assembly 3C of the lower multiple downcomer tray and the downcomer of the third downcomer assembly 3C of the upper multiple downcomer tray, or between the liquid receiving pan of the second downcomer assembly 3B of the lower multiple downcomer tray and the downcomer of the second downcomer assembly 3B of the upper multiple downcomer tray, in which the lower multiple downcomer tray is consecutively below the upper multiple downcomer tray. Specifically, as shown in FIG. 14a and FIG. 14b, the second reinforcing structure 62 is disposed between the first liquid receiving pan 33A of the lower multiple downcomer tray and the first downcomer 32A of the upper multiple downcomer tray, between the third liquid receiving pan 33C of the lower multiple downcomer tray and the third downcomer 32C of the upper multiple downcomer tray, or between the second liquid receiving pan 33B of the lower multiple downcomer tray and the second downcomer 32B of the upper multiple downcomer tray.

Figure 15A:
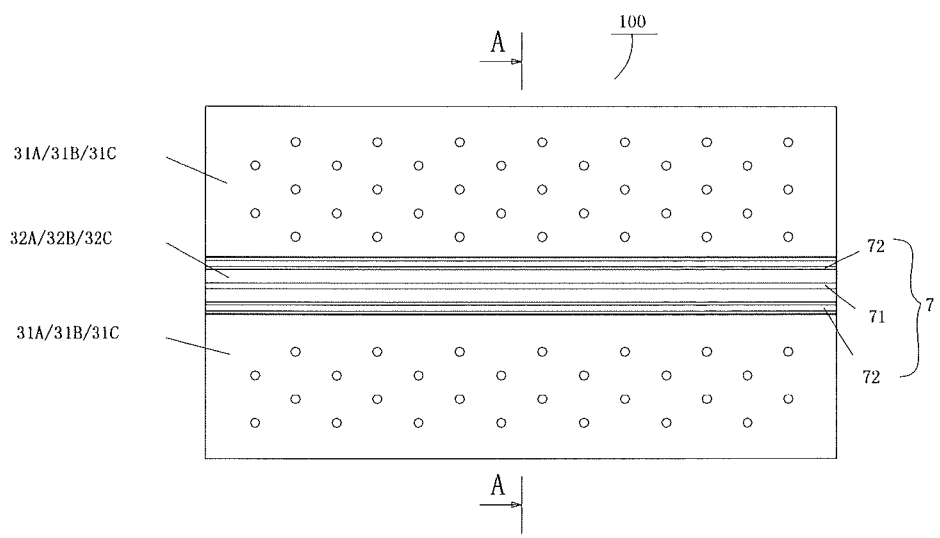
FIG. 15a is a schematic partial view of a multiple downcomer tray showing an anti-splash plate according to an embodiment of the present invention.
Figure 15B:
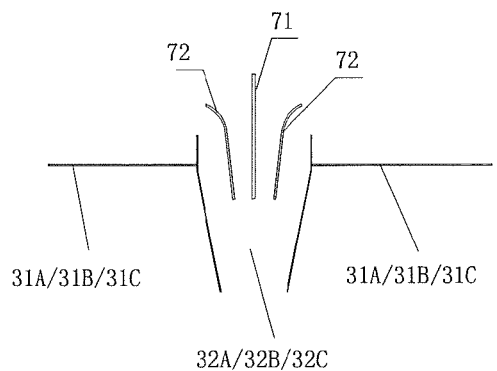

According to an embodiment of the present invention, an anti-splash plate 7 is disposed in at least one of the downcomers of the first downcomer assembly 3A, the second downcomer assembly 3B and the third downcomer assembly 3C. In other words, the anti-splash plate 7 is disposed in at least one of the first downcomer 32A, the second downcomer 32B and the third downcomer 32C, as shown in FIG. 15a and FIG. 15b. Specifically, a lower end of the anti-splash plate 7 is extended into the downcomer, and an upper end of the anti-splash plate 7 is extended upwards out of the downcomer. Alternatively, the anti-splash plate 7 disposed in each downcomer may comprise a first anti-splash plate 71 and at least two second anti-splash plates 72. The first anti-splash plate 71 is disposed vertically, and the at least two second anti-splash plates 72 are disposed at two sides of the first anti-splash plate 71 respectively and bent towards directions away from the first anti-splash plate 71 respectively. For example, there may be two second anti-splash plates 72. Thus, it is easy to prevent the liquid from splashing and to guide the flow of the liquid.

Figure 17A:
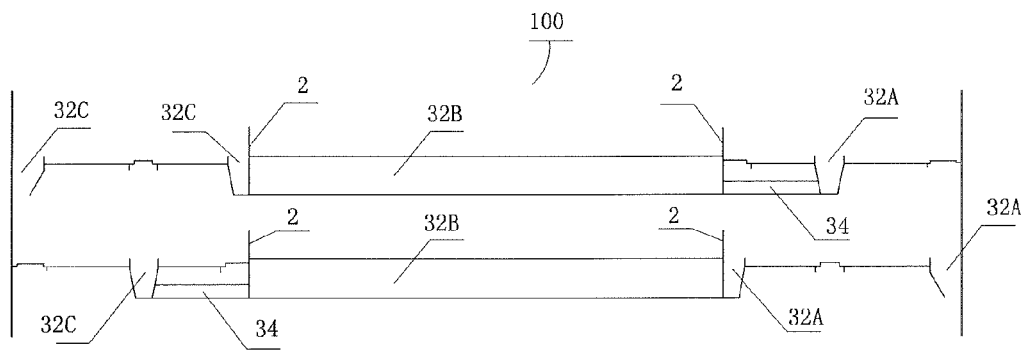
FIG. 17a is a sectional view of a tray column showing two adjacent downcomer trays according to an embodiment of the present invention, in which one end of the downcomer of the second downcomer assembly is communicated with the downcomer of the first downcomer assembly or the third downcomer assembly.
Figure 17B:
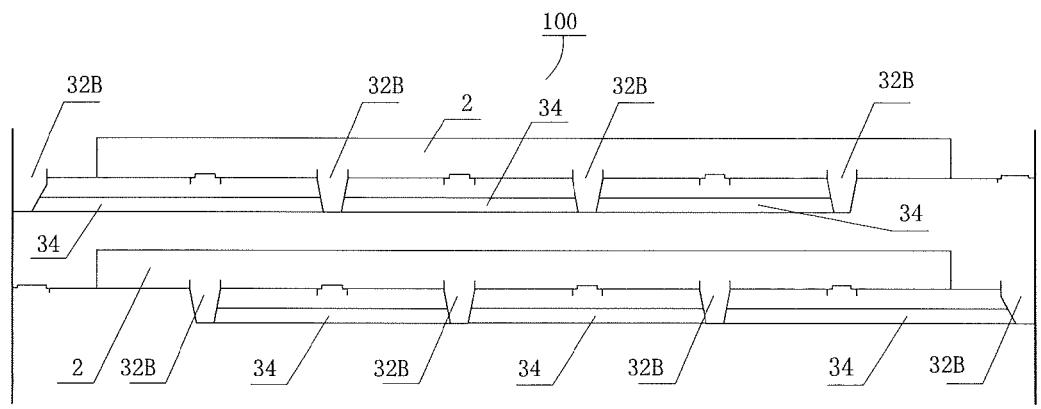
FIG. 17b is a sectional view of a tray column showing two adjacent downcomer trays according to another embodiment of the present invention, in which the downcomers of at least one of the first, second and third downcomer assemblies are communicated with each other.

As shown in FIG. 17a and FIG. 17b, in some embodiment of the present invention, the downcomers of at least one of the first downcomer assembly 3A, the second downcomer assembly 3B and the third downcomer assembly 3C are communicated with each other. In other embodiments of the present invention, one end of the downcomer of the second downcomer assembly 3B is communicated with the downcomer of the first downcomer assembly 3A or the third downcomer assembly 3B.

Specifically, the plurality of first downcomers 32A are communicated with each other via a communicating pipe 34 or directly, the plurality of second downcomers 32B are communicated with each other via a communicating pipe 34 or directly, the plurality of third downcomers 32C are communicated with each other via a communicating pipe 34 or directly, one end of the second downcomer 32B is communicated with the first downcomer 32A via a communicating pipe 34 or directly, or the other end of the second downcomer 32B is communicated with the second downcomer 32C via a communicating pipe 34 or directly, as shown in FIG. 17a and FIG. 17b.

Figure 19:
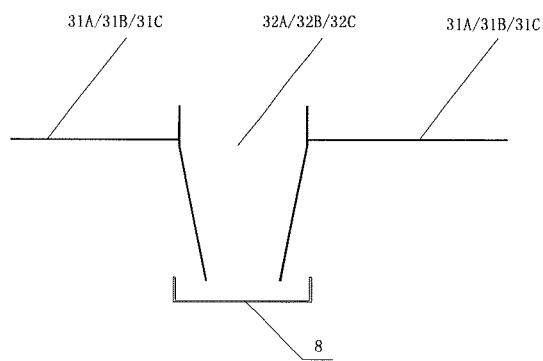
FIG. 19 is a schematic partial view of a multiple downcomer tray showing a liquid seal pan according to an embodiment of the present invention.

According to some embodiments of the present invention, a liquid seal pan 8 is disposed below at least one of the downcomers of at least one of the first downcomer assembly 3A, the second downcomer assembly 3B and the third downcomer assembly 3C. In other words, the liquid seal pan 8 is disposed below at least one of the first downcomer 32A, the second downcomer 32B and the third downcomer 32C, as shown in FIG. 19.

Figure 18A:
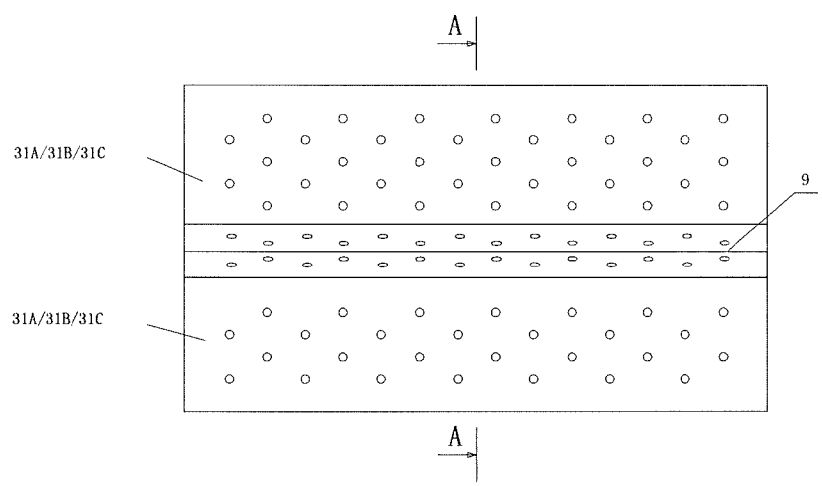
FIG. 18a is a schematic partial view of a multiple downcomer tray showing a kinetic energy eliminating device according to an embodiment of the present invention.
Figure 18B:
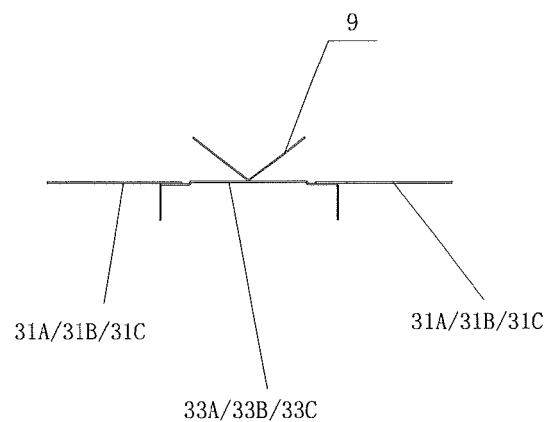

According to other embodiments of the present invention, a kinetic energy eliminating device 9 is disposed on at least one of the liquid receiving pans of at least one of the first downcomer assembly 3A, the second downcomer assembly 3B and the third downcomer assembly 3C. In other words, the kinetic energy eliminating device 9 is disposed on at least one of the first liquid receiving pan 33A, the second liquid receiving pan 33B and the third liquid receiving 33C, as shown in FIG. 18a and FIG. 18b.

With the multiple downcomer tray according to embodiments of the present invention, by combining with the advantages of the overflow tray and changing the structure of the multiple downcomer tray in the related art, the flow state of the liquid phase is improved, and the operation capability and tray efficiency of the tray are enhanced.

Other structures such as the column body of the tray column according to embodiments of the present invention, and operations thereof are well known to those skilled in the art, and will not described in detail herein.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the invention. Thus, the appearances of the phrases such as "in some embodiments", "in one embodiment", "in an embodiment", "an example", "a specific examples", or "some examples" in various places throughout this specification are not necessarily referring to the same embodiment or example of the invention.

Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the invention. Such changes, alternatives, and modifications all fall into the scope of the claims and their equivalents.

What is claimed is:

1. A multiple downcomer tray, comprising:
   a tray body;
   at least one anti jump plate disposed on the tray body to divide the tray body into at least two sections; and
   at least two downcomer assemblies disposed corresponding to the at least two sections respectively, wherein each of the at least two downcomer assemblies comprises at least one tray floor, at least one downcomer and at least one liquid receiving pan which are disposed parallel to each other, and the liquid receiving pan and the downcomer are positioned at two sides of the at least one tray floor respectively,
   wherein the at least one anti jump plate comprises a first anti-jump plate, and the first anti-jump plate divides the tray body into two sections; and
   wherein the at least two downcomer assemblies comprise a first downcomer assembly located in a first section at one side of the first anti jump plate and parallel to the first anti jump plate, and a second downcomer assembly located in a second section at the other side of the first anti-jump plate and perpendicular to the first anti jump plate.

2. The multiple downcomer tray according to claim 1, wherein the at least one anti jump plate further comprises a second anti jump plate parallel to the first anti jump plate, and the first anti jump plate and the second anti jump plate divide the tray body into three sections; and
   wherein the at least two downcomer assemblies further comprise a third downcomer assembly located in a third section at a side of the second anti jump plate away from the first anti jump plate, spaced apart from the second downcomer assembly by the second anti jump plate, and parallel to the second anti jump plate.

3. The multiple downcomer tray according to claim 1, wherein the second downcomer assembly is symmetric with respect to a perpendicular bisector of the at least one anti jump plate.

4. The multiple downcomer tray according to claim 1, wherein a first bubbling unit is disposed on each tray floor of the at least two downcomer assemblies.

5. The multiple downcomer tray according to claim 4, wherein a second bubbling unit is disposed on at least one of the at least one liquid receiving pan of at least one of the at least two downcomer assemblies.

6. The multiple downcomer tray according to claim 5, wherein a bubbling promotion device is disposed between at least one of the at least one tray floor of at least one of the at least two downcomer assemblies and a liquid receiving pan adjacent to the at least one of the at least one tray floor, and a third bubbling unit is disposed on the bubbling promotion device.

7. The multiple downcomer tray according to claim 1, wherein at least one of the downcomers of at least one of the at least two downcomer assemblies is cut off to form a hanging downcomer.

8. The multiple downcomer tray according to claim 1, wherein at least one first guide plate is disposed on at least one of the at least one tray floor of at least one of the at least two downcomer assemblies.

9. The multiple downcomer tray according to claim 1, wherein at least one second guide plate is disposed on at least one of the at least one liquid receiving pan of at least one of the at least two downcomer assemblies.

10. The multiple downcomer tray according to claim 9, wherein one end of the second guide plate is extended onto the at least one tray floor adjacent to the liquid receiving pan on which the second guide plate is disposed.

11. The multiple downcomer tray according to claim 1, wherein a first reinforcing structure is disposed on at least one of the downcomers of at least one of the at least two downcomer assemblies.

12. The multiple downcomer tray according to claim 1, wherein an anti-splash plate is disposed in at least one of the downcomers of at least one of the at least two downcomer assemblies.

13. The multiple downcomer tray according to claim 1, wherein the downcomers of at least one of the at least two downcomer assemblies communicate with each other.

14. The multiple downcomer tray according to claim 2, wherein an end of the downcomer of the second downcomer assembly communicates with the downcomer of the first downcomer assembly or the third downcomer assembly.

15. The multiple downcomer tray according to claim 1, wherein a liquid seal pan is disposed below at least one of the downcomers of at least one of the at least two downcomer assemblies.

16. The multiple downcomer tray according to claim 1, wherein a kinetic energy eliminating device is disposed on at least one of the at least one liquid receiving pan of at least one of the at least two downcomer assemblies.

* * * * *